United States Patent [19]

Knecht et al.

[11] Patent Number: 4,881,270

[45] Date of Patent: Nov. 14, 1989

[54] AUTOMATIC CLASSIFICATION OF IMAGES

[75] Inventors: John A. Knecht, Inyokern, Calif.; Darrell L. Chenoweth, Paoli, Ind.

[73] Assignee: The United States of America as represented by the Secretary of the Navy, Washington, D.C.

[21] Appl. No.: 546,755

[22] Filed: Oct. 28, 1983

[51] Int. Cl.⁴ .............................................. G06K 9/80
[52] U.S. Cl. ........................................ 382/17; 382/28; 382/43; 244/3.17
[58] Field of Search ............... 343/5 FT, 5 MM, 9 R, 343/9 PS; 382/17, 28, 43; 244/3.1, 3.16, 3.17; 364/726

[56] References Cited

U.S. PATENT DOCUMENTS

| | | | |
|---|---|---|---|
| 3,779,492 | 12/1973 | Grumet | 244/3.17 |
| 3,794,272 | 2/1974 | Hecker | 343/5 MM |
| 3,846,752 | 11/1974 | Nakano et al. | 382/43 |
| 4,073,010 | 2/1978 | Casasent et al. | 364/822 |
| 4,084,255 | 4/1978 | Casasent et al. | 364/822 |
| 4,155,072 | 5/1979 | Kawa | 340/146.3 H |
| 4,164,788 | 8/1979 | Jain | 364/515 |
| 4,254,400 | 3/1981 | Yoda et al. | 340/146.3 MA |
| 4,285,048 | 8/1981 | Casasent et al. | 364/822 |
| 4,490,851 | 12/1984 | Gerhart et al. | 382/43 |

OTHER PUBLICATIONS

*IEEE Transactions on Pattern Analysis and Machine Intelligence*, vol. PAMI-5, No. 2, p. 19, Swicke and Kiss; Mar., 1983.

Primary Examiner—Leo H. Boudreau
Assistant Examiner—Jacqueline Todd
Attorney, Agent, or Firm—William C. Townsend; Melvin J. Sliwka

[57] ABSTRACT

A method and system for classifying a raster scanned target image by collapsing the image into a vector corresponding to a horizontal line of the image, mathematically transforming this vector into a feature vector which corresponds to the power spectrum of the collapsed image, and comparing the feature vector with stored decision rules corresponding to classes of possible target objects to determine if the image represents an object in one of the classes.

2 Claims, 3 Drawing Sheets

AUTOMATIC CLASSIFICATION OF IMAGES

BACKGROUND OF THE INVENTION

1. Field of the Invention

This invention pertains to a method and system for the automatic classification of images, more particularly, it pertains to such a method and system for classifying the image, of a scanned object as the image of an object of one of a plurality of predetermined classes of objects Most particularly, this invention relates to such a method and system useful in a missile for classifying a potential target object, such as a ship, as a member of one class of several predetermined classes of ships.

2. Description of the Prior Art

Automatic classification of images is well known in many fields such as the fields of recognition of characters and of target objects. Such classification has received particular attention for distinguishing potential targets or threat objects in the fields of surveillance and missiles In the latter field, it is highly desirable that a missile launching vehicle remain as far as possible from an attacked object so that the vehicle may remain undetected. It is, therefore, highly desirable to provide an image classification system which is suitable for installation in a missile to be launched day or night at a long stand-off range toward a group of potential target objects, such as a fleet of ships, and which serves to identify the most desirable object, such as an aircraft carrier, and signal the guidance system of the missile so that the missile is directed toward this object rather than toward a less desirable target such as a destroyer or a non-combat ship. An image classification system suitable for use in a missile must not only be able to classify an image of a potential target in real or limited time but must be light in weight, compact, and have low power requirements.

It is well known to form the two-dimensional image of an object, as by a raster scan utilized in television and the like, and digitize the amplitude of energy received by a scanner from portions of the object so that the digitized image is, conceptually, a matrix in which the elements or pixels are numbers representing the energy received from corresponding small portions of the object. The received energy may be reflected ambient light or illumination, such as laser light, provided by the scanning system, or may be infrared radiation emitted by the object itself. Such infrared radiation has the desirable properties that it is always available, even at night, and avoids detection of a vehicle, such as a missile carrying the scanning system, by illumination emitted by the vehicle. The two-dimensional image is conceptually similar with different types of energy, but differs since different portions of a target object reflect or emit different energy levels with different types of radiation.

Once the digital image is available it may, in theory, be compared with stored images of classes of objects of interest to determine if the scanned object is one of those classes. However, since the image is represented, typically, by several thousand pixels, an impractically large amount of digital storage memory and time would be required to process the original image. As a result, a limited number of "features" are derived from the image to reduce the storage required. The use of the discrete Fourier transform to reduce the image to a series of coefficients which serve as the derived features is well known for this purpose. This transform is effective, for example, in character recognition in which there are a limited number of pixels, typically less than one hundred. The use of this transform is also well known in range-only-radar (ROR) in which there is obtained initially a one-dimensional vector having at most a few hundred components which represent amplitudes of reflected microwave energy from portions of an object spaced at different distances from a radar device. It is evident that such a vector provides the greatest resolution where an object such as a ship is scanned along its longitudinal axis and that such a vector does not provide a source of as many possible distinguishing features of the object as does a two-dimensional image. In scanning target objects, such as ships, from a moving vehicle, such as an aircraft or a missile, it is apparent that the size of the image derived from an object varies with the range thereto so that, in the past, the use of a transform, such as the Mellin transform, which is scale invariant has been preferred for image classification in this area in contrast to the Fourier transform which has been considered unsuitable as not being scale invariant. In any event, the limited number of pixels or vector components which must be processed in the field of character recognition or range-only-radar greatly simplifies the use of a suitable transform to extract image features.

In the character recognition field it is possible to obtain even illumination of a character. However, in the target recognition field noise from the environment and from movements of the scanned object and scanning vehicle and the like make it difficult to distinguish the pixels of a scanned image representing a potential target from those caused by noise. As a result, it is well known to utilize such well known image preprocessing techniques as a Sobel filter or median filter prior to feature extraction. These preprocessing techniques are, however, based on the relative magnitudes of adjacent pixels rather than on variations of energy received from the scanned object.

After the feature vector representing a scanned object is extracted from the image of the object, the art of image processing provides a number of approaches for determining that the image corresponds to the image of an object in one of several predetermined classes of objects Typically, this determination is made statistically by the use of stored decision rules corresponding individually to the classes. These rules are obtained by training an image classification system with images of objects known to be in each of the classes and deriving the decision rules from feature vectors obtained in the general manner to be used in classifying an unknown object. Typically, as is set forth in well known works on pattern recognition, the vectors from known classes of objects are reduced to decision rules statistically and some suitable classification scheme such as a nearest neighbor classifier or a Bayes classifier is used to compare the feature vector from an unknown object with the derived decision rules.

SUMMARY OF THE INVENTION

It is accordingly an object of the present invention to provide a method and system for the automatic classification of images wherein a two-dimensional image is obtained by scanning an object.

Another object is to provide such a method and system which reduces the information contained in such an image having a multiplicity of pixels to a feature vector having relatively few components but serving to distinguish the scanned object.

Another object is to provide such a system usable with a variety of scanning and digitizing devices and with decision rules derived in a variety of ways and representing a variety of predetermined classes of objects.

Another object is to provide such a method and system adapted for use in a missile and in real time to select the most appropriate target from a group of possible targets.

BRIEF DESCRIPTION OF THE DRAWINGS

Other objects, advantages, and novel features of the subject invention will become apparent from the following detailed description of the invention when considered with the accompanying drawing figures, wherein.

DESCRIPTION OF THE PREFERRED EMBODIMENT

Figure 1:
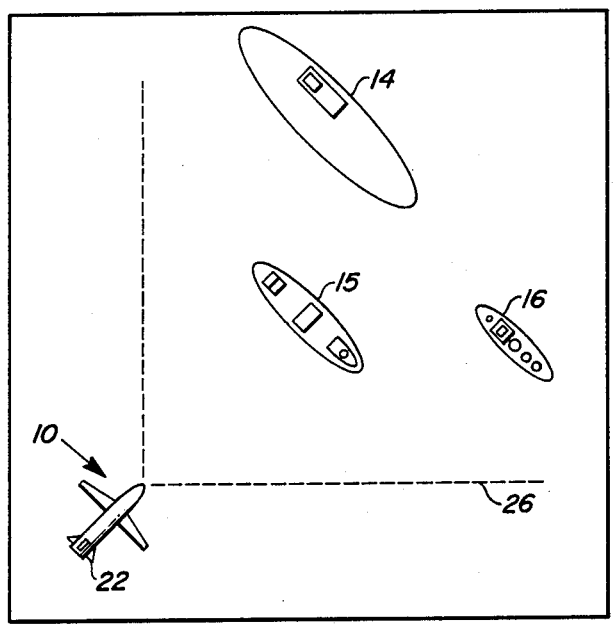
FIG. 1 is a schematic plan view showing the manner in which a missile having an image classification system of the present invention and carrying out the method thereof is utilized with potential target ships in a representative operating environment.
Figure 2:
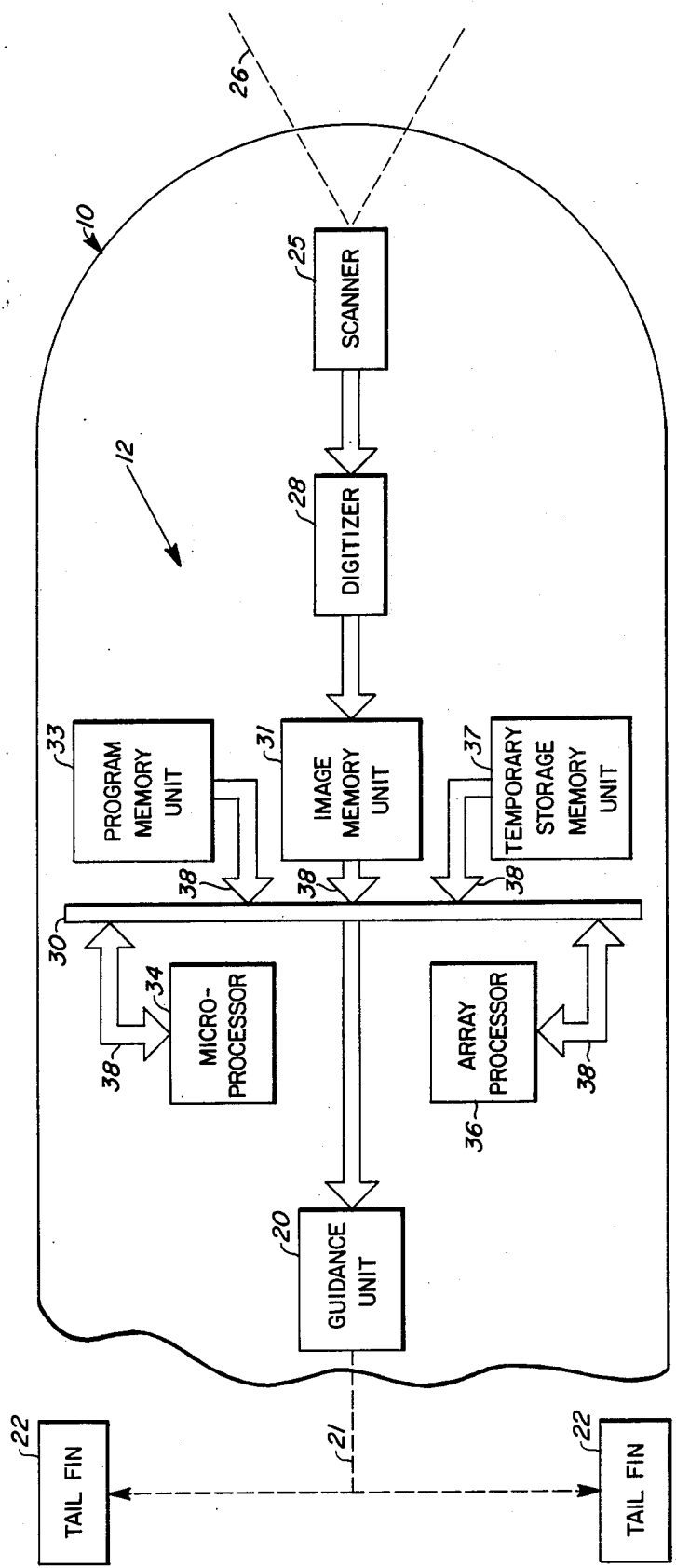
FIG. 2 is a block diagram of an image classification system, which carries out the method of the present invention, together with the associated scanning, digitizing, and guidance apparatus in a schematically represented missile.
Figure 4:
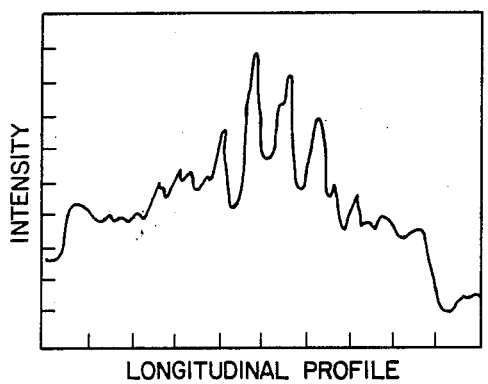
FIG. 4 is a graphical representation of a vector obtained by collapsing the pixels representing one of ship images of FIG. 3.
Figure 5:
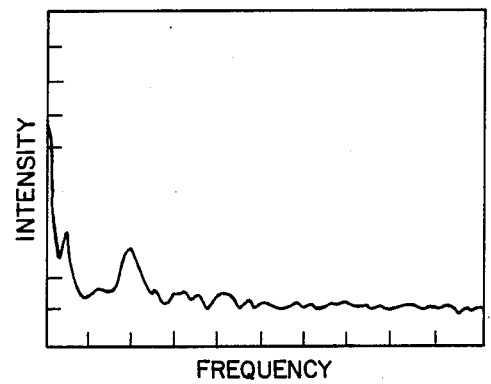
FIG. 5 is a graphical representation of a feature vector representing the Fourier power spectrum of the vector of FIG. 4 and utilizable to classify the corresponding ship image.

In FIGS. 1 and 2 is depicted a schematically represented missile 10 in which is mounted, as depicted in FIG. 2, a system 12 for the automatic classification of images. The system embodies the principles of the subject invention and is adapted to perform the steps of the method thereof. The missile is depicted in FIG. 1 in a representative operating environment which includes three schematically represented ships 14, 15 and 16 of different classes, namely a carrier, a merchantman, and a cruiser.

Missile 10, as schematically depicted in FIG. 2, has a guidance unit 20 which is of any suitable construction and serves to direct the course of the missile, as through a connection 21 represented by dash arrows to fins 22 of the missile, toward one of ships 14, 15, or 16 selected by system 12.

System 12 has a scanner 25, which is of well known construction and is schematically represented in FIG. 2. Scanner 25 is adapted to scan objects, such as ships 14, 15 and 16 with a well known raster scan in a field indicated by dash lines 26 in FIGS. 1 and 2. Scanner 25 receives and focuses energy from the various portions of each object scanned and, typically, is a scanner well known in forward looking infrared (FLIR) imaging systems to form an image using infrared energy emitted from the object day or night. However, scanner 25 may also be receptive, as is well known to those skilled in the art of image processing, to visible light reflected from the object as in a television (TV) system, or to laser light or other radiant energy emitted from the missile and reflected from the object. The system has a digitizer 28 which is of well known construction and which is connected to scanner 25 and converts the amplitude of energy received by scanner 25 from each portion of the object into a number representing this amplitude, such numbers representing each of the successive lines of the raster scan being provided sequentially by the digitizer. When, as shown in FIG. 1, scanner 25 is used to scan ships, successive such lines are typically taken along a first axis extending substantially horizontally and therefore, extending longitudinally of the ship when the ship is scanned from any direction except directly ahead or astern. Successive scan lines are, therefore, taken along a second axis extending substantially vertically.

A representative arrangement of the balance of system 12 is schematically depicted in FIG. 2 and includes a data bus 30 together with an image memory unit 31, which is referred to in the claims as a second memory unit and which receives digitized image data directly from the digitizer 28 and supplies image data to the bus. The system includes a read-only program memory unit 33 which stores a program for controlling certain steps of the method of the subject invention as executed by a microprocessor 34. The system also includes an array processor 36 and a temporary storage memory unit 37. These memory units and processors and guidance unit 20 are all connected to data bus 30 for data flow as indicated by the arrows 38. It is to be understood that system 12 as depicted in FIG. 2 is merely representative of arrangements well known to those skilled in the art of digital circuit design. For example, memory units 31, 33, and 37 might be portions of a common device which might also include processors 34 and 36.

OPERATION

Figure 3:
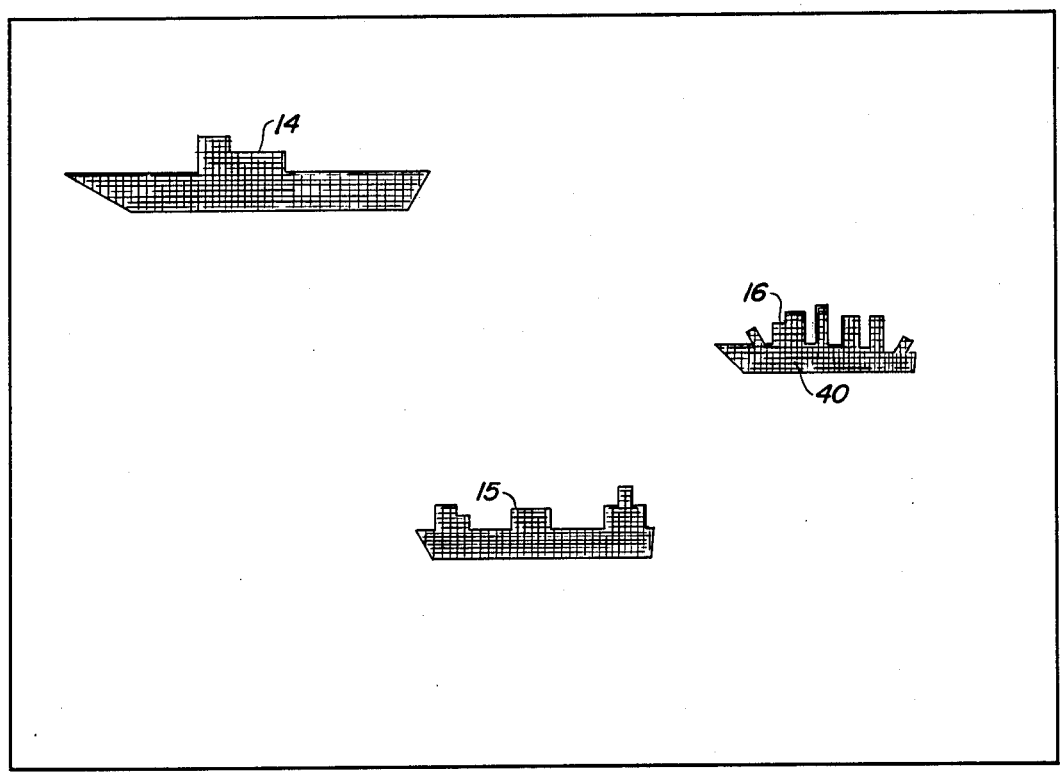
FIG. 3 is a simplified schematic image representative of an image obtained by scanning the ships of FIG. 1.

The operation of the described embodiment of the subject invention and the practice of the method thereof will now be described with reference to FIGS. 1–5. As missile 10 approaches ships 14, 15 and 16 with scanner 25 and digitizer 28 in operation, an overall two-dimensional image resembling FIG. 3 is generated with cruiser 16, for example, represented by a rectangular array of pixels 40 corresponding to similarly arranged portions of the cruiser. The numbers provided by the digitizer representing the amplitudes of the energy received from these portions are stored by image memory unit 31 in a manner, which is well known in the art of image processing, in a matrix in which the rows correspond to lines of the raster scan and in which the columns correspond to the vertically aligned pixels of the lines. As a result, a two-dimensional image of the cruiser is represented in the image memory unit by such a matrix wherein the rows and the columns correspond to portions of the cruiser spaced, respectively, along the above-identified first or horizontal and longitudinal axis and along the above-identified vertical axis. The scanner and digitizer thus serve to provide digitized values corresponding to a ship or other object to memory unit 31. When the matrix is generated, the image represented thereby, typically, is subjected by microprocessor 34 to well known preprocessing operations in the art of digital image processing such as the Sobel operator for edge enhancement and/or median filtering to remove noise.

When the matrix has been so preprocessed, its elements are then typically normalized by microprocessor 34 so that the numerical value of the elements fall within a predetermined range. The matrix representing the image of one of ships 14, 15, or 16 has, typically, in the order of 32 rows and 128 columns or over 4,000 elements, which may be termed features of the image. It is apparent that a relatively large memory unit and substantial processing time would be required to compare the normalized matrix with corresponding matrices representing classes of potential target objects. Therefore, in the subject invention the columns of the matrix are collapsed using microprocessor 34 onto one of the rows of the matrix to generate a first vector in which the components thereof correspond individually to the columns so collapsed and thus to the elements of one of the rows of the matrix. This collapsing is performed by arithmetically summing the elements of each of the columns to be collapsed. The sums from the columns so summed are utilized as the components of a first vector. This vector is, typically, stored in temporary storage memory unit 37. The number of features of a ship image is thereby reduced to the order of 128 features, which is still an impractically large number for real time processing during the time of a missile flight. However, it is apparent from examination of pixels 40 of FIG. 3 and the graphical representation of such first vector in FIG. 4, that the components of the vector correspond in general to the longitudinal profile of the original ship and to the energy received by spaced vertical portions of the ship along the horizontal or first scanning axis. These components are thus features identifying the original ship image.

Since, as before stated, the number of components in the first vector is undesirably large, this vector is next transformed mathematically into a feature vector having a much smaller number of components than the first vector but still corresponding to, for example, cruiser 16. It has been found that a suitable mathematical transform for this purpose is the Fourier transform. This transform is, preferably, carried out digitally using the discrete, fast Fourier transform (FFT) well known in the art of signal and pattern processing. Array processor 36 is any suitable device for performing an FFT on the feature vector, as provided to the array processor from temporary storage unit 37, under the control of microprocessor 34 in accordance with the program stored in memory unit 33. The array processor typically, is adapted to perform this transform, or calculations repeatedly used therein, in less time than would be required by the microprocessor. The result of the transform is, typically, a series of complex numbers which are terms or coefficients individually representing the amplitudes of various frequencies present in the first vector. It has been found that, for the purposes of the present invention, the first such coefficient, the zero frequency coefficient, may be disregarded and that, at most, the following fifteen coefficients serve to identify the first vector when the ten statistically most significant coefficients of the fifteen coefficients have been selected. In general the ten such complex coefficients corresponding to the ten lowest frequencies serve, after suitable mathematical operations, to represent the first vector and, therefore, the image, such as a ship image represented by pixels 40, represented by the vector. It has also been found that, since this image represents energy received from a ship or other scanned object and since the first vector obtained by collapsing the matrix represents the digitized image, the selected complex coefficients representing such an object most effectively represent the first vector when the absolute values of these coefficients are squared and utilized as a feature vector representing the object and first vector because the energy or power present at each frequency is proportional to the square of the amplitude thereof. The feature vector so obtained is thus the well known Fourier power spectrum of the frequencies which are present in the first vector and which correspond to the selected coefficients. The nature of such a feature vector will be apparent from FIG. 5 which is a graphical representation of the terms resulting from the FFT transform of the vector represented in FIG. 4.

It will be apparent to those skilled in the art of pattern and image recognition and classification that a multiplicity of such feature vectors derived in the manner just described, can be obtained by repeatedly scanning an object of each of a plurality of predetermined classes of objects of interest, as typified by potential target ships 14, 15, and 16, under relatively ideal conditions. This plurality of vectors is then stored in a memory unit, such as a memory unit of any suitable computer, not shown, for deriving in any suitable manner decision rules corresponding individually to each such class. These rules are then stored in a memory unit of system 12 for use thereby in classifying in real time a feature vector obtained by the system in scanning a potential target object and corresponding to the feature vector stored in the memory unit of the computer used to derive the decision rules. This generation of decision rules from feature vectors is known as "training" in such art, and the resulting decision rules are, typically, stored in program memory unit 33 of subject system 12. A feature vector obtained by this system from scanning a potential target, such as ship 16, is then compared, using microprocessor 34, with the decision rules stored in program memory unit 33 so as to classify the ship in one of the classes by any suitable classifier such as a well known Bayes classifier. If the ship is determined by the classifier to be in one of such classes which is of continuing interest, the microprocessor, in accordance with a suitable program stored in memory unit 34 and based on well known techniques of missile control, sends appropriate signals to guidance unit 20 which result in missile 10 being directed toward the ship.

It should be noted that the term "decision rule" and the term "classifier" are well known in the art of pattern recognition and classification, and the generation of such rules and the operation of a classifier suited to the practice of the subject invention are set forth together with suitable image enhancement and noise filtration techniques in various textbooks on this art, such as Duda and Hart, *Pattern Classification and Scene Analysis*, 1973; Hall, *Computer Image Processing and Recognition*, 1979; Pratt, *Digital Image Processing*, 1978; and Tou and Gonzales, *Pattern Recognition Principles*, 1974.

EXAMPLES

Figure 6:
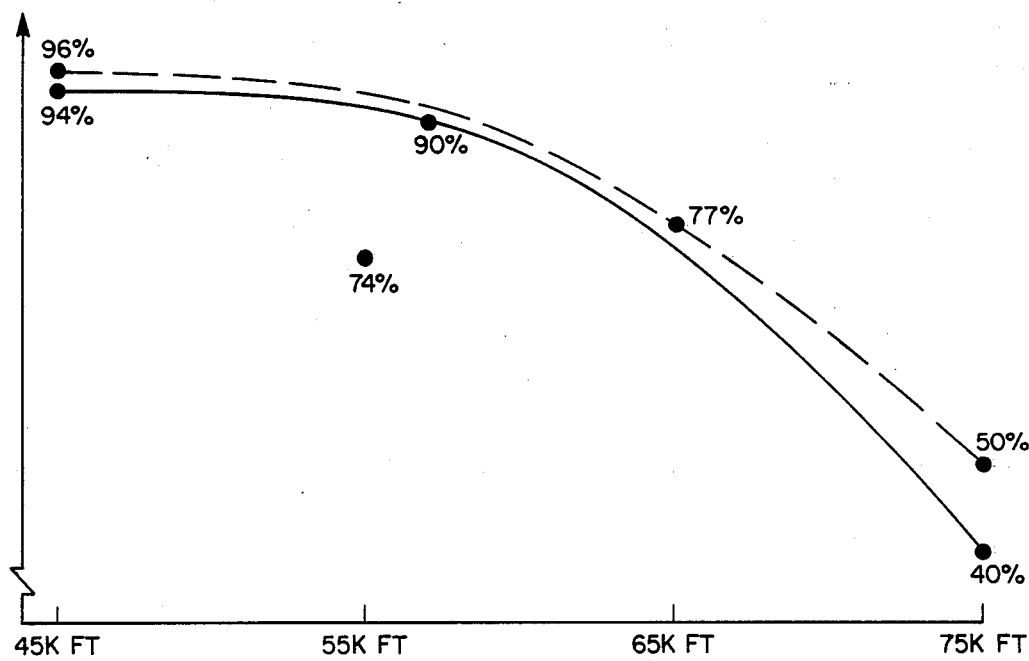
FIG. 6 is a graph showing classification results obtained with the subject invention.

Image classification results obtainable with the subject invention are shown in FIG. 6. Raster scanned images of ships of several classes were obtained at several ranges or simulated ranges and for a number of aspect ratios. As set forth above, the digitized matrix representing each image was then collapsed onto one row, and each resulting vector transformed into a power spectrum by using the ten lowest frequency coefficients resulting from use of the FFT, the zero frequency coefficient being excluded, and by squaring the absolute value of the ten coefficients. The resulting ten numbers served as a feature vector representing the original image. Feature vectors derived from images at the closest range were used for training to develop decision rules and these rules were then tested with the remaining vectors obtained at various ranges.

Results obtained with TV images of ship models are depicted by the solid line in FIG. 6. Samples were obtained from 3,420 models of three classes of Navy ships, foreign and United States, and of two classes of merchant ships. These samples used a 2° depression angle and simulated 0.25 radian resolution, used simulated ranges of 45, 55, and 75 thousand feet (KFT), used six lighting levels, and used aspect angles at increments of 10° for 360° around each ship. The images were enhanced with Sobel edge enhancement techniques and each was represented as a 128 by 32 matrix with each element being digitized with 8-bit resolution. Using decision rules developed at a simulated range of 45 KFT it is seen from FIG. 6 that the tests corresponding to 45, 55, and 75 KFT gave correct classification results respectively in 94%, 77%, and 40% of the test samples.

FLIR images were obtained on six classes of U.S. Navy ships at 30° and 90° angles relative to the bow and at various ranges simulating low altitude and missile and aircraft approach. The images were converted from 875 lines to 525 line format and then digitized as with the above-described TV images. The FLIR derived images were then preprocessed with median filtration prior to collapsing and FFT feature vector extraction. Results obtained using the method of the subject invention with testing at various ranges with decision rules obtained from training with feature vectors derived from the FLIR images at 45 KFT are depicted in dash lines in FIG. 6. It is seen that 77% success was obtained at 65 KFT and 50% at 75 KFT. The point at 55 KFT in which 74% success was obtained is believed not to be statistically significant since it is based on only 11 samples.

Obviously many modifications and variations of the present invention are possible in light of the above teachings. It is therefore to be understood that within the scope of the appended claims, the invention may be practiced otherwise than as specifically described above.

What is claimed is:

1. A method for the automatic classification of the image of a ship comprising the steps of:

scanning the ship to generate a two-dimensional image thereof represented by a matrix wherein the values of the elements thereof correspond to energy received from portions of the ship, the elements of the rows of the matrix corresponding to such portions spaced substantially horizontally and longitudinally of the ship and the elements of the columns of the matrix corresponding to such portions spaced substantially vertically;

summing predetermined elements of a plurality of said columns to generate a first vector in which the components thereof correspond individually to the columns of said plurality;

performing a discrete Fourier transform on the components of said first vector and squaring selected coefficients resulting from said transform to generate a feature vector which is the power spectrum of the first vector and which corresponds to said ship;

obtaining a plurality of such feature vectors under relatively ideal scanning conditions, the feature vectors of said plurality thereof corresponding individually to images of a ship of a predetermined class at a plurality of aspect angles and at a predetermined range; deriving from said plurality of feature vectors a decision rule corresponding to said class;

obtaining such a feature vector from such an image of a potential target ship; and comparing the feature vector from the image of the potential target ship with said decision rule to classify said target ship as being in said class or as being outside said class.

2. The method of claim 1:

wherein the method is carried out in a missile having means for scanning the potential target ship and for generating such an image thereof, means for generating such a feature vector from said image of said ship, means for storing the decision rule corresponding to said class, and means for comparison of said feature vector with said decision rule; and wherein the method further comprises the step of directing the missile toward the possible target ship when said ship is classified in said class.

* * * * *